US012738753B2

(12) United States Patent
Kwon et al.

(10) Patent No.: US 12,738,753 B2
(45) Date of Patent: Sep. 15, 2026

(54) APPARATUS FOR MANAGING SAFETY OF SECONDARY BATTERY AND METHOD THEREOF

(71) Applicant: LG ENERGY SOLUTION, LTD., Seoul (KR)

(72) Inventors: Jae-Kuk Kwon, Daejeon (KR); Kyung-Jik Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 791 days.

(21) Appl. No.: 17/800,454

(22) PCT Filed: Oct. 5, 2021

(86) PCT No.: PCT/KR2021/013632

§ 371 (c)(1),
(2) Date: Aug. 17, 2022

(87) PCT Pub. No.: WO2022/075707

PCT Pub. Date: Apr. 14, 2022

(65) Prior Publication Data

US 2023/0093274 A1 Mar. 23, 2023

(30) Foreign Application Priority Data

Oct. 5, 2020 (KR) ........................ 10-2020-0128193

(51) Int. Cl.
*H02J 7/65* (2026.01)
*H01M 10/42* (2006.01)
(Continued)

(52) U.S. Cl.
CPC ............. *H02J 7/65* (2026.01); *H01M 10/425* (2013.01); *H01M 10/443* (2013.01);
(Continued)

(58) Field of Classification Search
CPC .. H02J 7/00309; H02J 7/0013; H02J 7/00308; H02J 7/0063; H02J 7/0029;
(Continued)

(56) References Cited

U.S. PATENT DOCUMENTS

| | | | |
|---|---|---|---|
| 5,252,411 | A | 10/1993 | Yokokawa et al. |
| 2002/0105304 | A1 | 8/2002 | Hald et al. |

(Continued)

FOREIGN PATENT DOCUMENTS

| | | | |
|---|---|---|---|
| CN | 1294472 | A | 5/2001 |
| CN | 103682507 | A | 3/2014 |

(Continued)

OTHER PUBLICATIONS

Extended European Search Report for European Application No. 21877958.5, dated Dec. 1, 2023.

(Continued)

*Primary Examiner* — Julian D Huffman
*Assistant Examiner* — Aiman Bickiya
(74) *Attorney, Agent, or Firm* — Birch, Stewart, Kolasch & Birch, LLP

(57) ABSTRACT

An apparatus including a control unit operably coupled to a voltage measuring unit, a temperature measuring unit and a discharging switch. The control unit measures a cell voltage and a cell temperature by using the voltage measuring unit and the temperature measuring unit, turns on the discharging switch to forcibly discharge the secondary battery through a load resistor when it is determined that a state where the cell voltage and the cell temperature are respectively equal to or greater than a critical voltage and a critical temperature according to a preset swelling management condition continues over a reference time, and turns off the discharging switch when a cell voltage or a cell temperature measured during the forced discharge falls below a preset safe voltage
(Continued)

or a preset safe temperature according to the swelling management condition.

20 Claims, 4 Drawing Sheets

(51) Int. Cl.
*H01M 10/44* (2006.01)
*H01M 10/48* (2006.01)
*H02J 7/50* (2026.01)
*H02J 7/64* (2026.01)

(52) U.S. Cl.
CPC ............. *H01M 10/486* (2013.01); *H02J 7/50* (2026.01); *H02J 7/64* (2026.01); *H01M 2010/4271* (2013.01); *H01M 2220/20* (2013.01)

(58) Field of Classification Search
CPC ...... H02J 7/00; H01M 10/425; H01M 10/443; H01M 10/486; H01M 2010/4271; H01M 2220/20; H01M 2200/00; H01M 10/44; H01M 10/42; H01M 10/48; H01M 10/482; Y02E 60/10; G01R 31/367; G01R 31/396
USPC .......................................................... 320/136
See application file for complete search history.

(56) References Cited

U.S. PATENT DOCUMENTS

| | | | | |
|---|---|---|---|---|
| 2007/0131268 | A1* | 6/2007 | Taniguichi .......... | H02J 7/00309 136/205 |
| 2009/0243545 | A1 | 10/2009 | Iwamura et al. | |
| 2009/0322284 | A1 | 12/2009 | Tsai | |
| 2011/0121787 | A1 | 5/2011 | Kim et al. | |
| 2014/0084873 | A1 | 3/2014 | Sim et al. | |
| 2016/0322676 | A1 | 11/2016 | Jun et al. | |
| 2018/0149462 | A1 | 5/2018 | Ghantous et al. | |
| 2019/0363407 | A1 | 11/2019 | Noh | |
| 2020/0335835 | A1 | 10/2020 | Song et al. | |
| 2020/0386823 | A1 | 12/2020 | Lee et al. | |
| 2021/0043914 | A1* | 2/2021 | Lee .................. | H02J 7/007182 |
| 2022/0029444 | A1* | 1/2022 | Chen ................. | H02J 7/007188 |

FOREIGN PATENT DOCUMENTS

| | | | | | |
|---|---|---|---|---|---|
| CN | 105548889 | A | | 5/2016 | |
| CN | 111433618 | A | | 7/2020 | |
| CN | 111684647 | A | | 9/2020 | |
| EP | 1 094 587 | A | | 4/2001 | |
| JP | 4-281340 | A | | 10/1992 | |
| JP | 2002-56900 | A | | 2/2002 | |
| JP | 4006877 | B2 | | 11/2007 | |
| JP | 2010-49968 | A | | 3/2010 | |
| JP | 2010-200552 | A | | 9/2010 | |
| JP | 2011-61391 | A | | 3/2011 | |
| JP | 5065958 | B2 | | 11/2012 | |
| JP | 5098501 | B2 | | 12/2012 | |
| JP | .2013-17354 | A | | 1/2013 | |
| JP | 5575441 | B2 | | 8/2014 | |
| JP | 2017-85735 | A | | 5/2017 | |
| JP | 2017085684 | A | * | 5/2017 | |
| JP | 2020-68628 | A | | 4/2020 | |
| JP | 2020-514990 | A | | 5/2020 | |
| JP | 2021-18969 | A | | 2/2021 | |
| KR | 10-2011-0058378 | A | | 6/2011 | |
| KR | 10-2015-0025052 | A | | 3/2015 | |
| KR | 2016067600 | A | * | 6/2016 | ............... H02H 5/00 |
| KR | 10-2016-0129626 | A | | 11/2016 | |
| KR | 10-2017-0123093 | A | | 11/2017 | |
| KR | 10-2017-0142451 | A | | 12/2017 | |
| KR | 20170142451 | A | * | 12/2017 | .......... H01M 10/443 |
| KR | 10-2018-0076578 | A | | 7/2018 | |
| KR | 10-2019-0042340 | A | | 4/2019 | |
| KR | 10-2019-0114553 | A | | 10/2019 | |
| KR | 10-2019-0143181 | A | | 12/2019 | |
| KR | 10-2020-0089828 | A | | 7/2020 | |
| WO | WO 2006/064726 | A1 | | 6/2006 | |

OTHER PUBLICATIONS

International Search Report for PCT/KR2021/013632 mailed on Jan. 24, 2022.

* cited by examiner

FIG. 2

APPARATUS FOR MANAGING SAFETY OF SECONDARY BATTERY AND METHOD THEREOF

TECHNICAL FIELD

The present application claims priority to Korean Patent Application No. 10-2020-0128193 filed on Oct. 5, 2020, in the Republic of Korea, the disclosures of which are incorporated herein by reference.

The present disclosure relates to a safety management apparatus and method capable of effectively managing swelling of a secondary battery in a high-temperature and high-voltage state.

BACKGROUND ART

Secondary batteries are used as power sources in various devices since they can be repeatedly charged and discharged.

Secondary batteries are used in handheld devices that can be carried in a person's hand, such as cell phones, laptop computers, digital cameras, video cameras, tablet computers, power tools, and the like.

Recently, in addition to handheld devices, secondary batteries are widely used in electric-powered vehicles such as hybrid electric vehicles, plug-in hybrid vehicles, and electric vehicles.

Secondary batteries are subject to swelling when placed in a high-temperature and high-voltage state. This is because the electrolyte contained in the secondary battery causes a side reaction to generate gas. The side reaction of the electrolyte mainly occurs on the electrode surface, and the electrolyte itself also causes a decomposition reaction.

If the swelling phenomenon intensifies, it causes a safety issue of the secondary battery. This is because the pressure inside the secondary battery increases due to swelling. The increase in pressure causes electrolyte or gas leakage, and if the pressure increases to a critical point, the secondary battery explodes.

The swelling phenomenon also negatively affects the performance of the secondary battery. The swelling phenomenon increases the contact resistance of the electrodes and thus increases the internal resistance of the secondary battery. The increase in internal resistance increases the consumed energy due to heat generation when the secondary battery is charged and discharged.

The secondary battery is manufactured in the form of a pack according to the capacity of a load device. A secondary battery manufactured in the form of a pack includes a plurality of cells connected in series and/or in parallel and a battery management system.

The battery management system controls the charging and discharging of the secondary battery. In addition, the battery management system protects the secondary battery from dangerous conditions. Dangerous conditions include overcharge, overdischarge, overcurrent, rapid temperature rise, and the like.

Protection of the secondary battery includes turning off a switch installed on a path through which a charge/discharge current flows or operating a fuse to irreversibly block the current path.

Secondary batteries may be exposed to high-temperature environments where swelling is intensified depending on the usage environment of the load device. For example, a mobile device including a secondary battery may be placed near a heater or a heating machine. In addition, an electric vehicle including a secondary battery may be parked for a long time while exposed to direct sunlight. In addition, secondary batteries may be subjected to unexpected high-temperature storage conditions. For example, a temperature control system of a warehouse that stores secondary batteries may malfunction. In addition, a container in which a large amount of secondary batteries are stored to transport the secondary batteries may be exposed to direct sunlight for a long time, so the temperature inside the container may rise rapidly.

When the secondary battery is in storage, the battery management system maintains a sleep mode. Therefore, the battery management system does not actively control the secondary battery to lower the temperature of the secondary battery even when the secondary battery is in a state where swelling intensifies.

In addition, the load device to which the secondary battery is mounted may not have a function of cooling the secondary battery. In this case, it is difficult to control the swelling of the secondary battery exposed to the high temperature environment.

In addition, the load device to which the secondary battery is mounted may provide a mechanism for cooling the secondary battery. The cooling mechanism is an air-cooling or water-cooling mechanism. However, the cooling mechanism focuses only on controlling the temperature of the secondary battery.

According to the study of the inventors of the present disclosure, the swelling of the secondary battery is affected not only by the temperature but also by the voltage of the secondary battery. In other words, when the secondary battery has the same temperature, the swelling becomes more severe as the voltage of the secondary battery is higher.

Therefore, by the cooling mechanism focusing only on controlling the temperature of the secondary battery, it is not possible to effectively manage the swelling of the secondary battery.

DISCLOSURE

Technical Problem

The present disclosure is designed to solve the problems of the related art, and therefore the present disclosure is directed to providing an apparatus and method for managing safety of a secondary battery, which may effectively manage swelling by considering voltage and temperature of the secondary battery at the same time even if the secondary battery is exposed to a high temperature environment.

The present disclosure is also directed to providing an apparatus and method for managing safety of a secondary battery, which may effectively manage swelling of the secondary battery according to temperature and voltage of the secondary battery even when the secondary battery is in a high-temperature storage state.

The present disclosure is also directed to providing an apparatus and method for managing safety of a secondary battery, which may effectively manage swelling of the secondary battery according to the temperature and voltage of the secondary battery independently from a cooling mechanism of a load device even if the load device to which the secondary battery is mounted is exposed to a high temperature environment.

Technical Solution

In one aspect of the present disclosure, there is provided an apparatus for managing safety of a secondary battery, comprising: a voltage measuring unit configured to measure a voltage of a cell included in the secondary battery; a temperature measuring unit configured to measure a temperature of the cell included in the secondary battery; a discharging switch connected in parallel with a charging and discharging path of the secondary battery; a load resistor connected between the discharging switch and a ground; and a control unit operably coupled to the voltage measuring unit, the temperature measuring unit and the discharging switch.

Preferably, the control unit may be configured to measure a cell voltage and a cell temperature by using the voltage measuring unit and the temperature measuring unit, turn on the discharging switch to forcibly discharge the secondary battery through the load resistor when it is determined that a state where the cell voltage and the cell temperature are respectively equal to or greater than a critical voltage and a critical temperature according to a preset swelling management condition continues over a reference time, and turn off the discharging switch when a cell voltage or a cell temperature measured through the voltage measuring unit and the temperature measuring unit during the forced discharge falls below a preset safe voltage or a preset safe temperature according to the swelling management condition.

According to an embodiment, the swelling management condition may be set as a plurality of conditions, and the critical voltage and the critical temperature may be set independently for each condition among the plurality of conditions.

According to another embodiment, the swelling management condition may be set as a plurality of conditions, and the safe voltage and the safe temperature may be set independently for each condition among the plurality of conditions.

The apparatus for managing safety of a secondary battery according to the present disclosure may further comprise a memory unit in which a look-up table defining a critical voltage, a critical temperature, a safe voltage and a safe temperature according to the swelling management condition is recorded.

In another aspect of the present disclosure, there is also provided an apparatus for managing safety of a secondary battery including a plurality of cells, comprising: a voltage measuring unit configured to measure voltages of the plurality of cells; a temperature measuring unit configured to measure temperatures of the plurality of cells; a discharging switch connected in parallel with a charging and discharging path of the secondary battery; a load resistor connected between the discharging switch and a ground; and a control unit operably coupled to the voltage measuring unit, the temperature measuring unit and the discharging switch.

The control unit may be configured to measure voltages and temperatures of the plurality of cells through the voltage measuring unit and the temperature measuring unit, turn on the discharging switch to forcibly discharge the secondary battery through the load resistor when it is determined that a state where a maximum value of the cell voltages and a maximum value of the cell temperatures are respectively equal to or greater than a critical voltage and a critical temperature according to a preset swelling management condition continues over a reference time, and turn off the discharging switch when the maximum value of a plurality of cell voltages and the maximum value of a plurality of cell temperatures measured through the voltage measuring unit and the temperature measuring unit during the forced discharge falls below a preset safe voltage or a preset safe temperature according to the swelling management condition.

The apparatus for managing safety of a secondary battery according to the present disclosure may further comprise a timer unit configured to apply an operation start signal to the control unit whenever a predetermined time passes, and when the operation start signal is applied from the timer unit, the control unit may be configured to receive a power from the secondary battery to start an operation and come into a sleep mode or a power-off mode after turning off the discharging switch.

In another aspect of the present disclosure, there is also provided a battery management system, comprising the apparatus for managing safety of a secondary battery described above, and a load device, comprising the battery management system.

In another aspect of the present disclosure, there is also provided a method for managing safety of a secondary battery, comprising: (a) providing a discharging switch connected in parallel with a charging and discharging path of the secondary battery and a load resistor connected between the discharging switch and the ground; (b) measuring voltage and temperature of a cell included in the secondary battery by using a voltage measuring unit and a temperature measuring unit; (c) turning on the discharging switch to forcibly discharge the secondary battery through the load resistor when a state where the cell voltage and the cell temperature are respectively equal to or greater than a critical voltage and a critical temperature according to a preset swelling management condition continues over a reference time; and (d) turning off the discharging switch when a cell voltage or a cell temperature measured through the voltage measuring unit or the temperature measuring unit during the forced discharge falls below a preset safe voltage or a preset safe temperature according to the swelling management condition.

According to an embodiment, the swelling management condition may be set as a plurality of conditions, and the critical voltage and the critical temperature may be set independently for each condition.

According to another embodiment, the swelling management condition may be set as a plurality of conditions, and the safe voltage and the safe temperature may be set independently for each condition.

The method for managing safety of a secondary battery according to the present disclosure may further comprise: referring to a look-up table defining a critical voltage, a critical temperature, a safe voltage and a safe temperature according to the swelling management condition.

In another aspect of the present disclosure, there is also provided a method for managing safety of a secondary battery, comprising: (a) providing a discharging switch connected in parallel with a charging and discharging path of the secondary battery including a plurality of cells and a load resistor connected between the discharging switch and the ground; (b) measuring voltages and temperatures of the plurality of cells through a voltage measuring unit and a temperature measuring unit; (c) turning on the discharging switch to forcibly discharge the secondary battery through the load resistor when it is determined that a state where a maximum value of the cell voltages and a maximum value of the cell temperatures are respectively equal to or greater than a critical voltage and a critical temperature according to a preset swelling management condition continues over a reference time; and (d) turning off the discharging switch when a maximum value of a plurality of cell voltages and a maximum value of a plurality of cell temperatures measured through the voltage measuring unit and the temperature measuring unit during the forced discharge falls below a preset safe voltage or a preset safe temperature according to the swelling management condition.

The method for managing safety of a secondary battery according to the present disclosure may further comprise: receiving an operation start signal from a timer unit whenever a predetermined time passes; receiving a power from the secondary battery to start an operation when the operation start signal is applied; and after the step (d), turning off the discharging switch and then coming into a sleep mode or a power-off mode.

Advantageous Effects

According to the present disclosure, since it is possible to prevent the secondary battery from being maintained at a temperature and voltage that may intensify the swelling, it is possible to effectively prevent the secondary battery from swelling. In addition, it is possible to prevent explosion accidents or fire accidents that occur due to swelling while the secondary battery is being stored. In addition, by managing the voltage level of the secondary battery at an appropriate level that does not cause swelling according to the storage temperature of the secondary battery, it is possible to prevent the performance of the secondary battery from deteriorating.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 2 is a flowchart for illustrating a method for managing safety of a secondary battery according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the embodiments described below, a secondary battery refers to a lithium secondary battery. Here, the lithium secondary battery collectively refers to a secondary battery in which lithium ions act as operating ions during charging and discharging to cause an electrochemical reaction at a positive electrode and a negative electrode.

Meanwhile, even if the name of the secondary battery changes depending on the type of electrolyte or separator used in the lithium secondary battery, the type of packaging material used to package the secondary battery, and the interior or exterior structure of the lithium secondary battery, as long as lithium ions are used as operating ions the secondary battery should be interpreted as being included in the category of the lithium secondary battery.

The present disclosure may also be applied to other secondary batteries other than the lithium secondary battery. Therefore, even if the operating ions are not lithium ions, any secondary battery to which the technical idea of the present disclosure may be applied should be interpreted as being included in the category of the present disclosure regardless of its type.

In addition, the secondary battery is not limited by the number of elements thereof. Therefore, the secondary battery should also be construed as encompassing not only a unit cell including an assembly of a positive electrode, a separator and a negative electrode and an electrolyte in one package, but also an assembly in which unit cells are connected in series and/or in parallel, a module in which a plurality of assemblies are connected in series and/or in parallel, a pack in which a plurality of modules are connected in series and/or in parallel, a battery system in which a plurality of packs are connected in series and/or in parallel, and the like.

Figure 1:
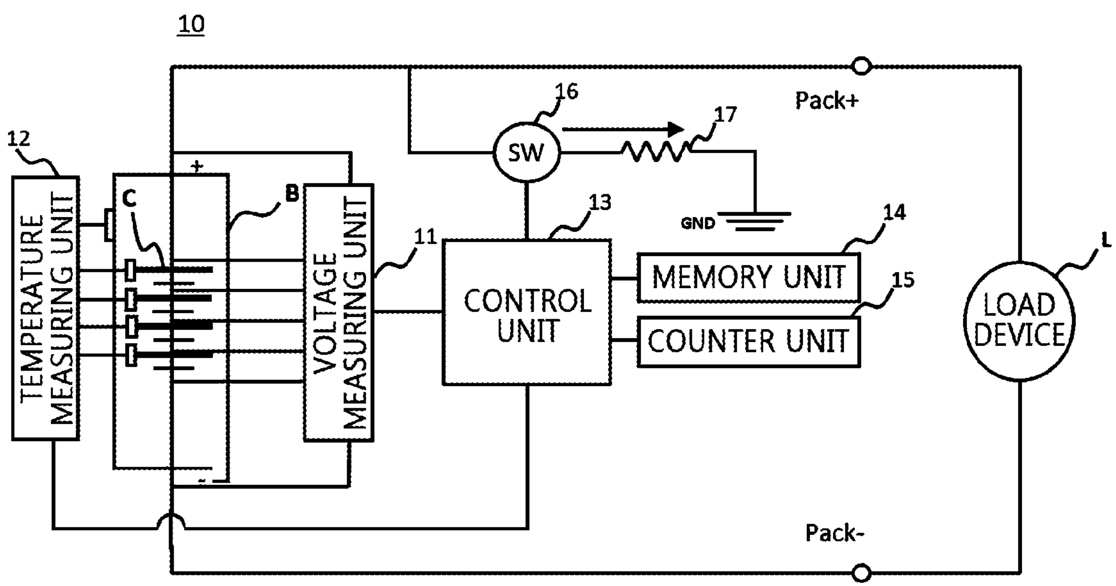
FIG. 1 is a block diagram schematically showing the configuration of an apparatus for managing safety of a secondary battery according to an embodiment of the present disclosure.

FIG. 1 is a block diagram schematically showing an apparatus 10 for managing safety of a secondary battery (hereinafter, also referred to as a safety management apparatus) according to an embodiment of the present disclosure.

Referring to FIG. 1, the safety management apparatus 10 according to an embodiment of the present disclosure includes a voltage measuring unit 11, a temperature measuring unit 12, and a control unit 13, and effectively manages swelling by allowing the temperature and voltage of cell(s) included in a secondary battery B to be maintained in a voltage and temperature range where the swelling does not intensify by forcibly discharging the secondary battery B.

The secondary battery B may include a single cell or a plurality of cells C. The plurality of cells C may be connected in series and/or in parallel.

In one example, a high potential terminal PACK+ and a low potential terminal PACK− of the secondary battery B may be electrically connected to a power line of a load device L.

The load device L is a device that receives a power from the secondary battery B, and may be a handheld device that can be carried in a person's hand, such as a mobile phone, a laptop computer, a digital camera, a video camera, a tablet computer, and a power tool. Also, the load device L may be an electric-powered vehicle such as a hybrid electric vehicle, a plug-in hybrid vehicle, and an electric vehicle.

In another example, the secondary battery B may not be connected to the load device L but in a storage state. The storage location of the secondary battery B may be a warehouse or a container for transporting the secondary battery B. However, the present disclosure is not limited thereto.

The safety management apparatus 10 of the secondary battery B may further include a memory unit 14. The type of the memory unit 14 is not particularly limited, as long as the memory unit 14 is a storage medium capable of recording and erasing information.

As an example, the memory unit 14 may be a RAM, a ROM, a register, a hard disk, an optical recording medium, or a magnetic recording medium.

The memory unit 14 may be electrically connected to the control unit 13 through, for example, a data bus so that it may be accessed by the control unit 13.

The memory unit 14 stores and/or updates and/or erases and/or transmits a program including various control logic executed by the control unit 13, and/or data generated when the control logics are executed, and/or preset data or a look-up table.

The memory unit 14 may be logically divided into two or more parts, and may also be included the control unit 13 without limitation.

The voltage measuring unit 11 is electrically coupled to the control unit 13 to send and receive electrical signals. The voltage measuring unit 11 measures the voltage of the cell(s) included in the secondary battery B at a time interval and outputs a signal indicating the magnitude of the measured voltage to the control unit 13 under the control of the control unit 13. The control unit 13 determines the voltage of the cell(s) included in the secondary battery B from the signal output from the voltage measuring unit 11 and stores the determined voltage value in the memory unit 14. The voltage measuring unit 11 includes a voltage measuring circuit commonly used in the art.

When the secondary battery B includes a plurality of cells C, the voltage measuring unit 11 may measure the voltage of each cell and output a signal indicating the magnitude of the measured voltage to the control unit 13. To this end, the voltage measuring unit 11 may include a plurality of voltage measuring circuits capable of simultaneously or time-differentially measuring the voltages of the cells.

The temperature measuring unit 12 is electrically coupled to the control unit 13 to send and receive electrical signals. The temperature measuring unit 12 measures the temperature of the cell(s) included in the secondary battery B at a time interval and outputs a signal indicating the magnitude of the measured temperature to the control unit 13 under the control of the control unit 13. The control unit 13 determines the temperature of the cell(s) included in the secondary battery B from the signal output from the temperature measuring unit 12 and stores the determined temperature value in the memory unit 14. The temperature measuring unit 12 may be configured with a thermocouple generally used in the art.

When the secondary battery B includes a plurality of cells C, the temperature measuring unit 12 may measure the temperature of each cell and output a signal indicating the magnitude of the measured temperature to the control unit 13. To this end, the temperature measuring unit 12 may include a plurality of thermocouples for measuring the temperatures of the cells.

The safety management apparatus 10 of the secondary battery B may include a discharging switch 16 connected in parallel with a charging and discharging path of the secondary battery B, and a load resistor 17 connected between the discharging switch 16 and the ground GND.

Preferably, the charging and discharging path may be a line connected to the positive electrode of the secondary battery B and a high-potential power line of the load device L.

Preferably, the discharging switch 16 may be a field effect transistor (FET), a mechanical relay switch or a power semiconductor switch. Also, the load resistor 17 may be a resistor element.

According to an embodiment, the control unit 13 may periodically measure the voltage and temperature of the cell included in the secondary battery B by using the voltage measuring unit 11 and the temperature measuring unit 12. Here, the secondary battery B includes one cell.

The control unit 13 also determines whether a state where the cell voltage and the cell temperature are respectively equal to or greater than a critical voltage and a critical temperature according to a preset swelling management condition continues over a reference time.

Here, the critical voltage and the critical temperature may be set as a plurality of conditions according to the swelling management condition as shown in Table 1 below. In addition, the critical voltage and the critical temperature may be set independently for each swelling management condition. Preferably, the reference time may also be set independently for each swelling management condition. Table 1 shows two swelling management conditions, but it is obvious that the conditions may be three or more.

TABLE 1

| swelling management condition | critical temperature | critical voltage | reference time |
|---|---|---|---|
| Condition 1 | 63° C. | 4050 mV | 5 sec |
| Condition 2 | 71° C. | 3950 mV | 5 sec |
| . . . | . . . | . . . | . . . |

In Table 1, the critical temperature and the critical voltage may be determined by loading the cell included in the secondary battery B into a constant-temperature chamber that may keep the cell temperature constant and then performing a charging test in a temperature section where swelling occurs.

For example, after charging the cell to 4050 mV in a state where the temperature of the constant-temperature chamber is set to 63° C., the degree of swelling of the cell is measured according to time. Then, the reference time may be set by counting the time until the cell volume increases by 1% and subtracting a safety margin from the counted time. The cell is a lithium polymer battery, and may be a pouch cell.

As another example, after charging the cell to 3950 mV in a state where the temperature of the constant-temperature chamber is set to 71° C., the degree of swelling of the cell is measured according to time. Then, the reference time may be set by counting the time until the cell volume increases by 1% and subtracting a safety margin from the counted time. The cell is a lithium polymer battery, and may be a pouch cell.

In the above experiment, the temperature section and the voltage section where swelling occurs are identified, and then the charging test is performed under a plurality of high-voltage conditions while increasing the cell temperature by 1° C. in the identified temperature section, thereby determining the critical temperature, and critical voltage and the reference time for each condition. That is, the reference time may be determined for each voltage while changing the voltage of the cell under one temperature condition.

Meanwhile, the swelling % level, which is the criterion for determining the critical temperature and the critical voltage, may be arbitrarily changed. For example, it is possible to change the swelling level to a level of 0.5%. In this case, when the critical temperature and the critical voltage are the same, the reference time may be shortened. In addition, the level of the critical voltage may be lowered at the same temperature, or the critical temperature may be lowered at the same voltage. In addition, the critical temperature, the critical voltage and the reference time may be changed depending on the type of cell included in the secondary battery B.

If it is determined that a state where the cell voltage and the cell temperature are respectively equal to or greater than the critical voltage and the critical temperature according to the preset swelling management condition continues over the reference time, the control unit 13 turns on the discharging switch 16 to forcibly discharge the secondary battery B through the load resistor 17.

For example, if it is determined that the cell voltage and the cell temperature are respectively equal to or greater than the critical temperature (63° C.) and the critical voltage (4050 mV) according to the condition 1 and the corresponding temperature and voltage are maintained for 5 seconds or more, the control unit 13 turns on the discharging switch 16 to forcibly discharge the secondary battery B through the load resistor 17.

As another example, if it is determined that the cell voltage and the cell temperature are respectively equal to or greater than the critical temperature (71° C.) and the critical voltage (3950 mV) according to the condition 2 and the corresponding temperature and voltage are maintained for 5 seconds or more, the control unit 13 turns the discharging switch 16 to forcibly discharge the secondary battery B through the load resistor 17.

The control unit 13 also periodically measures the cell voltage and the cell temperature through the voltage measuring unit 11 and the temperature measuring unit 12 during the forced discharge of the secondary battery B. In addition, the control unit 13 turns off the discharging switch 16 if the cell voltage or the cell temperature measured during forced discharge of the secondary battery B falls below a preset safe voltage or a preset safe temperature according to the corresponding swelling management condition.

Table 2 below shows an embodiment of the safe temperature and the safe voltage preset for each swelling management condition.

the voltage measuring unit 11 and the temperature measuring unit 12 while the secondary battery B is forcibly discharged since the cell temperature and the cell voltage satisfy the condition 2. In addition, the control unit 13 turns off the discharging switch 16 if the cell temperature measured while the secondary battery B is forcibly discharged is lowered below 50° C. or the cell voltage is lowered below 3900 mV.

Preferably, the information on the critical temperature, the critical voltage, the reference time, the safe temperature and the safe voltage according to the swelling management condition described above may be stored in the memory unit 14 in the form of a look-up table.

According to another embodiment of the present disclosure, the secondary battery B may include a plurality of cells C. In this case, the control unit 13 may control the swelling of the secondary battery B as follows.

First, the control unit 13 periodically measures the voltage and temperature of the plurality of cells C by using the voltage measuring unit 11 and the temperature measuring unit 12, and determines a maximum value of the cell voltages and a maximum value of the cell temperatures.

The control unit 13 also determines whether a state where the maximum value of the cell voltages and the maximum value of the cell temperatures are respectively equal to or greater than the critical voltage and critical temperature according to the preset swelling management condition continues over the reference time.

If it is determined that the state where the maximum value of the cell voltages and the maximum value of the cell temperatures are respectively equal to or greater than the critical voltage and the critical temperature according to the preset swelling management condition continuous over the reference time, the control unit 13 turns on the discharging switch 16 to forcibly discharge the secondary battery B through the load resistor 17. Then, the plurality of cells C included in the secondary battery B is forcibly discharged.

The control unit 13 also periodically measures the voltage and temperature of the plurality of cells C by using the voltage measuring unit 11 and the temperature measuring unit 12 while the secondary battery B is being discharged, and determines the maximum value of the cell voltages and the maximum value of the cell temperatures.

The control unit 13 also turns off discharging switch 16 to stop the forced discharge of the secondary battery B if the maximum value of the cell voltages is lowered below a safe voltage preset for the swelling management condition in

TABLE 2

| swelling management condition | critical temperature | critical voltage | reference time | safe temperature | safe voltage |
|---|---|---|---|---|---|
| Condition 1 | 63° C. | 4050 mV | 5 sec | 50° C. | 4000 mV |
| Condition 2 | 71° C. | 3950 mV | 5 sec | 50° C. | 3900 mV |
| . . . | . . . | . . . | . . . | . . . | . . . |

In one example, the control unit 13 periodically measures the cell voltage and the cell temperature through the voltage measuring unit 11 and the temperature measuring unit 12 while the secondary battery B is forcibly discharged since the cell temperature and the cell voltage satisfy the condition 1. In addition, the control unit 13 turns off the discharging switch 16 if the cell temperature measured while the secondary battery B is forcibly discharged is lowered below 50° C. or the cell voltage is lowered below 4000 mV.

In another example, the control unit 13 periodically measures the cell voltage and the cell temperature through which the forced discharge is initiated or the maximum value of the cell temperatures is lowered below a safe temperature preset for the swelling management condition in which the forced discharge is initiated.

According to another embodiment of the present disclosure, the safety management apparatus 10 may further include a counter unit 15.

Preferably, the counter unit 15 may count the time and apply an operation start signal for starting the control unit 13 to the control unit 13 at regular time intervals.

Preferably, the control unit 13 may maintain a sleep mode or a power-off state until the operation start signal is applied from the counter unit 15.

If the counter unit 15 is provided, especially when the secondary battery B is in a storage state, the control unit 13 may effectively manage the swelling of the secondary battery B.

If the secondary battery B is in a storage state, the control unit 13 may receive a power from the secondary battery B. Accordingly, if the control unit 13 continues to maintain the operating state to execute the above-described control logic, the state of charge of the secondary battery B may be lowered to come into an over-discharge state.

The control unit 13 starts the operation to execute the above-described control logic only when the operation start signal is applied from the counter unit 15, and if the swelling management condition is not satisfied, the control unit 13 may be turned off or come into a sleep mode to minimize the power consumption of the secondary battery B.

According to the present disclosure, if the high-temperature and high-voltage state where the temperature and voltage of the cell included in the secondary battery B cause swelling is maintained over a certain time, it is possible to minimize swelling of the cell(s) by forcibly discharging the cell(s) included in the secondary battery B to lower the voltage level or lower the temperature. In addition, if the secondary battery B is in a storage state, it is possible to prevent the performance of the secondary battery B from being deteriorated while the secondary battery B is in a storage state by well managing the swelling of the cell(s) included in the secondary battery B at an appropriate level while minimizing the power consumption of the control unit 13.

In the present disclosure, the control unit 13 may optionally include a processor, an application-specific integrated circuit (ASIC), another chipset, a logic circuit, a register, a communication modem, a data processing device, or the like, known in the art to execute the various control logics described above. In addition, when the control logic is implemented in software, the control unit 13 may be implemented as a set of program modules. At this time, the program module may be stored in a memory and executed by a processor. The memory may be provided inside or outside the processor and be connected to the processor through various well-known computer components. Also, the memory may be included in the memory unit 14 of the present disclosure. In addition, the memory refers to a device in which information is stored, regardless of the type of device, and does not refer to a specific memory device.

In addition, one or more of the various control logics of the control unit 13 may be combined, and the combined control logics may be written in a computer-readable code system and recorded in a computer-readable recording medium. The recording medium is not particularly limited as long as it is accessible by a processor included in a computer. As an example, the storage medium includes at least one selected from the group consisting of a ROM, a RAM, a register, a CD-ROM, a magnetic tape, a hard disk, a floppy disk and an optical data recording device. The code scheme may be distributed to a networked computer to be stored and executed therein. In addition, functional programs, codes and code segments for implementing the combined control logics may be easily inferred by programmers in the art to which the present disclosure belongs.

Hereinafter, a method for managing safety of a secondary battery performed by the control unit 13 according to an embodiment of the present disclosure will be described in detail with reference to FIG. 2.

Figure 2:
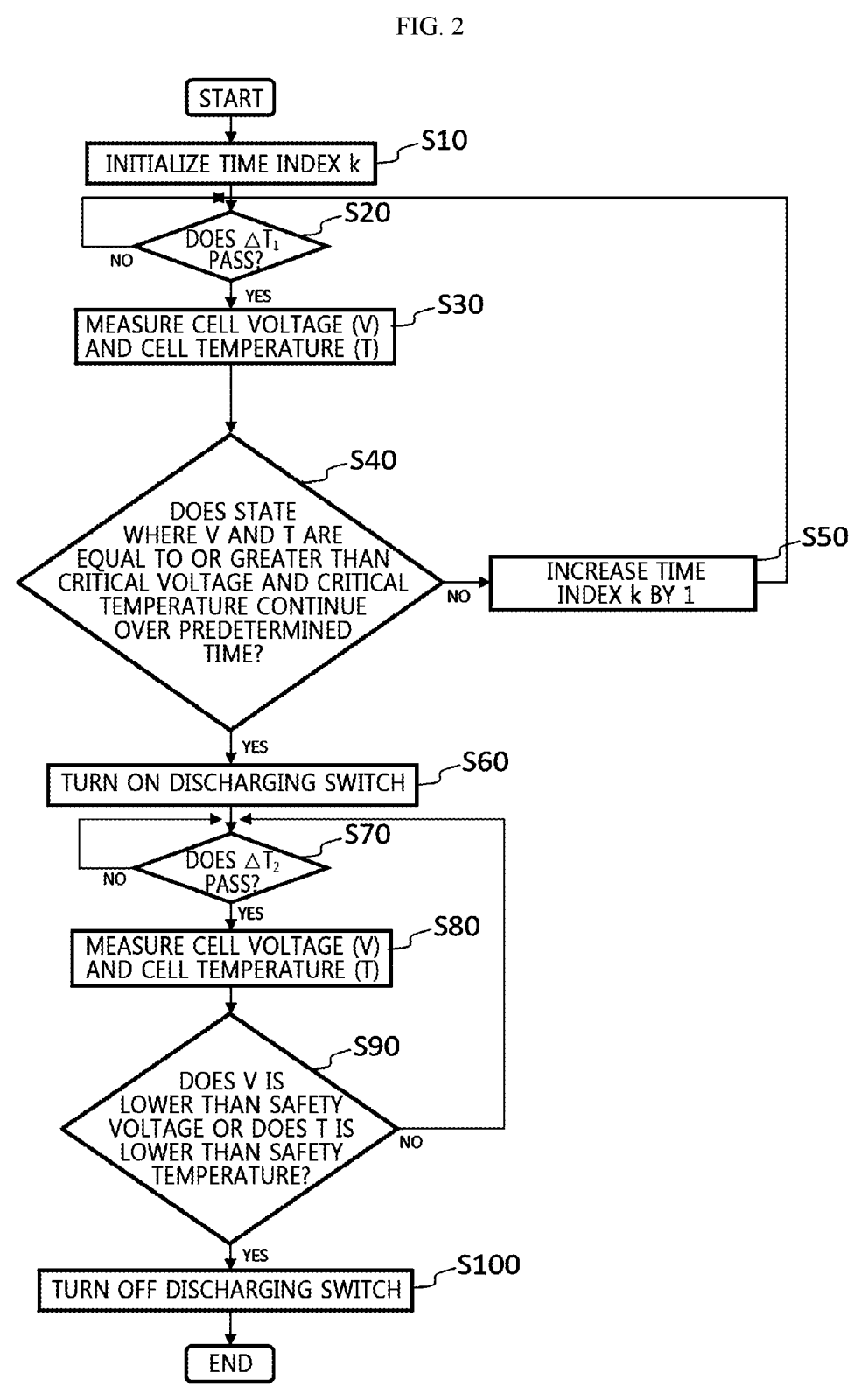

FIG. 2 is a flowchart for illustrating a method for managing safety of a secondary battery according to an embodiment of the present disclosure.

First, in Step S10, the control unit 13 initializes a time index k if the process for managing swelling of the secondary battery B starts. Here, the secondary battery B includes one cell.

In Step S20, the control unit 13 determines whether time $\Delta T_1$ passes. Here, $\Delta T_1$ is a measurement period of voltage (V) and temperature (T) of the cell included in the secondary battery B.

If the determination of Step S20 is YES, Step S30 proceeds, whereas if the determination of Step S20 is NO, the process progress is held.

In Step S30, the control unit 13 measures the cell voltage (V) and the cell temperature (T) by using the voltage measuring unit 11 and the temperature measuring unit 12. Preferably, the control unit 13 may record the measured values for the cell voltage (V) and the cell temperature (T) in the memory unit 14.

In Step S40, the control unit 13 determines whether the cell voltage (V) and the cell temperature (T) are equal to or greater than the critical voltage and the critical temperature set according to the swelling management condition and whether the corresponding state is maintained over the reference time. If the determination of Step S40 is YES, Step S60 proceeds. Meanwhile, if the determination of Step S40 is NO, the control unit 13 increases the time index k by 1 in Step S50, then returns the process to Step S20 to periodically repeat the routine of measuring the cell voltage (V) and the cell temperature (T).

In Step S60, the control unit 13 turns on the discharging switch 16 to forcibly discharge the secondary battery B.

In Step S70, the control unit 13 determines whether time $\Delta T_2$ passes. Here, $\Delta T_2$ is a period in which the cell voltage (V) and the cell temperature (T) are measured while the secondary battery B is forcibly discharged. If the determination of Step S70 is YES, Step S80 proceeds, whereas if the determination of Step S70 is NO, the process progress is held.

In Step S80, the control unit 13 measures the cell voltage (V) and the cell temperature (T) of the forcibly discharged secondary battery B by using the voltage measuring unit 11 and the temperature measuring unit 12. Preferably, the control unit 13 may store the measured values of the cell voltage (V) and the cell temperature (T) in the memory unit 14.

In Step S90, the control unit 13 determines whether the cell voltage (V) measured during the forced discharge of the secondary battery B is lowered below the safe voltage or the cell temperature (T) measured during the forced discharge of the secondary battery B is lowered below the safe temperature.

Here, the safe voltage and the safe temperature are voltage and temperature preset for the swelling management condition in which the forced discharge of the secondary battery B is initiated.

If the determination of Step S90 is YES, Step S100 proceeds. Meanwhile, if the determination of Step S90 is NO, the control unit 13 returns the process to Step S70 to repeat Step S80 and Step S90.

In Step S100, the control unit 13 turns off the discharging switch 16 to end the forced discharge of the secondary battery B. By doing so, the process for managing the swelling of the secondary battery B ends.

According to an embodiment, the above-described process may be repeated at regular intervals. That is, the control unit 13 may repeat the process shown in FIG. 2 again after a predetermined time passes after turning off the discharging switch 16.

According to another embodiment, when the operation start signal is applied from the counter unit 15, the control unit 13 may receive a power from the secondary battery B to start an operation and perform the above-described process. In addition, the control unit 13 may minimize the power consumption of the secondary battery B by coming into a sleep mode or coming into a power-off state after turning off the discharging switch 16 in Step S100 or when the determination of Step S40 is NO.

Figure 3:
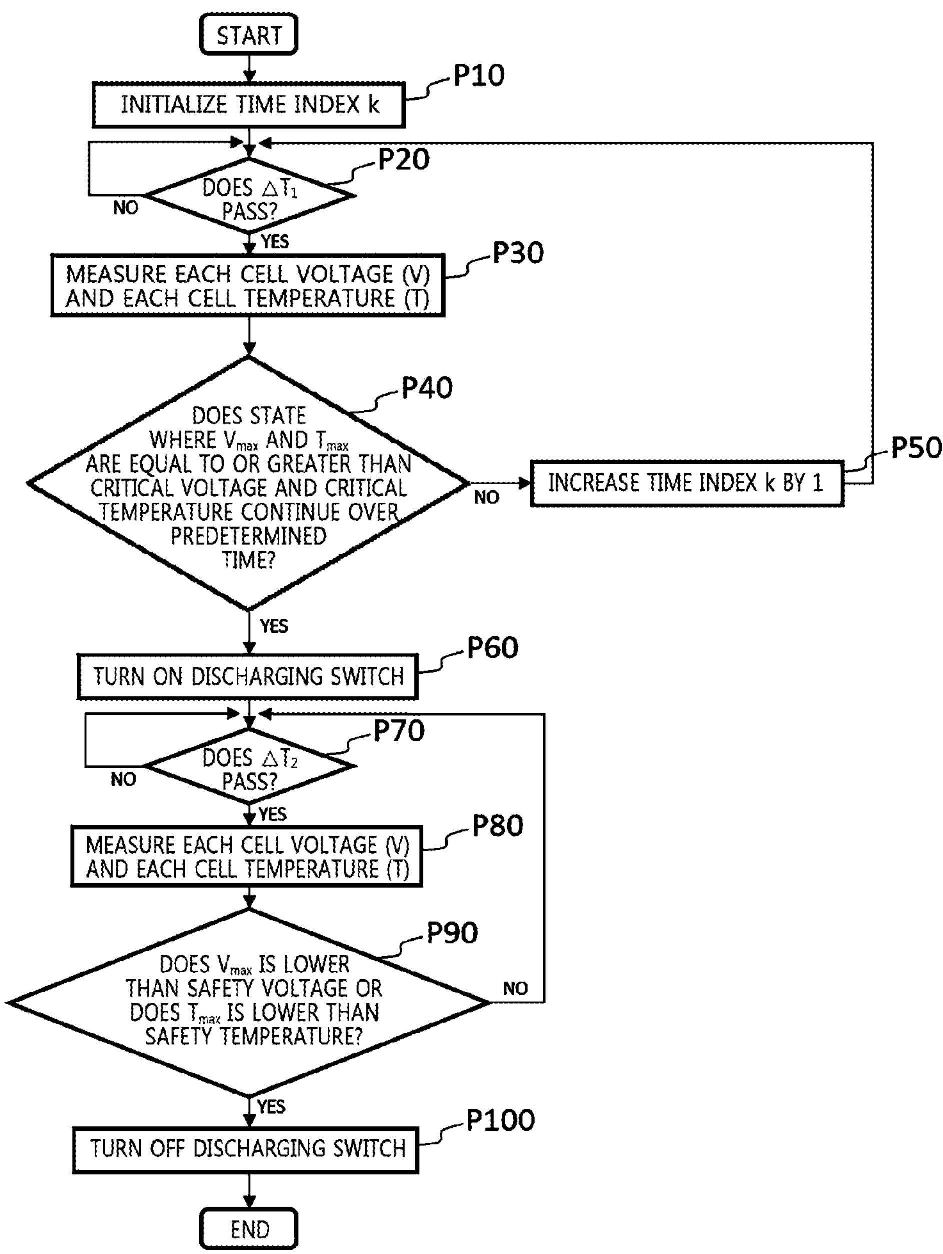
FIG. 3 is a flowchart for illustrating a method for managing safety of a secondary battery according to another embodiment of the present disclosure.

FIG. 3 is a flowchart for illustrating a method for managing safety of a secondary battery according to another embodiment of the present disclosure.

First, in Step P10, the control unit 13 initializes the time index k when the process for managing swelling of the secondary battery B starts. Here, the secondary battery B includes a plurality of cells C. The plurality of cells C may be connected in series and/or in parallel.

In Step P20, the control unit 13 determines whether time $\Delta T_1$ passes. Here, $\Delta T_1$ is a measurement period of voltage and temperature of the plurality of cells C. If the determination of Step P20 is YES, Step P30 proceeds, whereas if the determination of Step P20 is NO, the process progress is held.

In Step P30, the control unit 13 measures the voltages (V) and the temperatures (T) of the plurality of cells C by using the voltage measuring unit 11 and the temperature measuring unit 12. Preferably, the control unit 13 may record the measured values for the voltage (V) and the temperature (T) of each cell in the memory unit 14.

In Step P40, the control unit 13 determines a maximum value ($V_{max}$) of the plurality of cell voltages (V) and a maximum value ($T_{max}$) of the plurality of cell temperatures (T), and determines whether the maximum value ($V_{max}$) of the cell voltages (V) and the maximum value ($T_{max}$) of the cell temperatures (T) are respectively equal to or greater than the critical voltage and the critical temperature set according to the swelling management condition and whether the corresponding state is maintained over the reference time.

If the determination of Step P40 is YES, Step P60 proceeds. Meanwhile, if the determination of Step P40 is NO, the control unit 13 increases the time index k by 1 in Step P50 and then returns the process to Step P20 to periodically repeat the routine for measuring the voltage (V) and the temperature (T) of the plurality of cells C.

In Step P60, the control unit 13 turns on the discharging switch 16 to forcibly discharge the secondary battery B through the load resistor 17. If the forced discharge through the load resistor 17 is started, the plurality of cells C are forcibly discharged simultaneously.

In Step P70, the control unit 13 determines whether time $\Delta T_2$ passes. Here, $\Delta T_2$ is a period in which the voltage (V) and the temperature (T) are measured for the plurality of cells C while the secondary battery B is forcibly discharged. If the determination of Step P70 is YES, Step P80 proceeds, whereas if the determination of Step P70 is NO, the process progress is held.

In Step P80, the control unit 13 measures the voltage (V) and the temperature (T) of the plurality of forcibly discharged cells C by using the voltage measuring unit 11 and the temperature measuring unit 12. Preferably, the control unit 13 may store the measured values of the voltage (V) and the temperature (T) of each cell in the memory unit 14.

In Step P90, the control unit 13 determines a maximum value ($V_{max}$) of the plurality of cell voltages (V) and a maximum value ($T_{max}$) of the plurality of cell temperatures (T) while the secondary battery B is forcibly discharged and determines whether the maximum value ($V_{max}$) of the cell voltages (V) is lowered below the safe voltage or the maximum value ($T_{max}$) of the cell temperatures (T) is lowered below the safe temperature.

Here, the safe voltage and the safe temperature are voltage and temperature preset for the swelling management condition in which the forced discharge of the secondary battery B is initiated.

If the determination of Step P90 is YES, Step P100 proceeds. Meanwhile, if the determination of Step P90 is NO, the control unit 13 returns the process to Step P70 to repeat Step P80 and Step P90.

In Step P100, the control unit 13 turns off the discharging switch 16 to end the forced discharge of the secondary battery B. By doing so, the process for managing the swelling of the secondary battery B including the plurality of cells C is ended.

According to an embodiment, the above-described process may be repeated at regular intervals. That is, the control unit 13 may repeat the process shown in FIG. 3 again when a predetermined time passes after turning off the discharging switch 16.

According to another embodiment, when the operation start signal is applied from the counter unit 15, the control unit 13 may receive a power from the secondary battery B to start an operation and perform the above-described process. In addition, the control unit 13 may minimize the power consumption of the secondary battery B by coming into a sleep mode or coming into a power-off state after turning off the discharging switch 16 in Step P100 or when the determination of Step P40 is NO.

According to the present disclosure, since it is possible to prevent the secondary battery B from being maintained at a temperature and voltage that may intensify the swelling, it is possible to effectively prevent the secondary battery B from swelling. In addition, it is possible to prevent explosion accidents or fire accidents that occur due to swelling while the secondary battery B is being stored. In addition, by managing the voltage level of the secondary battery B at an appropriate level that does not cause swelling according to the storage temperature of the secondary battery B, it is possible to prevent the performance of the secondary battery B from deteriorating.

Figure 4:
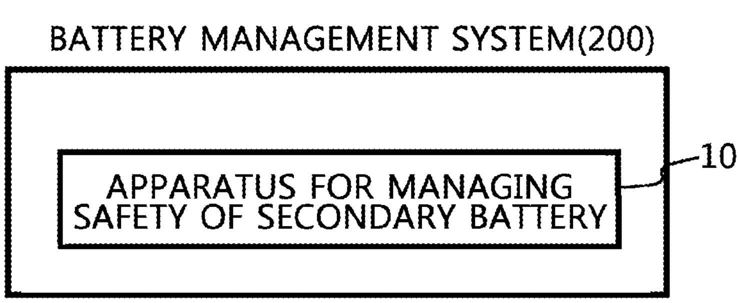
FIG. 4 is a block diagram showing a battery management system including the apparatus for managing safety of a secondary battery according to an embodiment of the present disclosure.

The safety management apparatus 10 of the secondary battery B according to the embodiment of the present disclosure described above may be included in a battery management system 200 as shown in FIG. 4. The battery management system 200 is a computing device that manages the charging and discharging operation of the secondary battery B, protects the secondary battery B from dangerous situations such as overcharge or overdischarge, and calculates and manages state parameters of the secondary battery B such as state of charge and state of health.

Figure 5:
FIG. 5 is a block diagram showing a load device including the battery management system according to another embodiment of the present disclosure.

In addition, the battery management system 200 including the apparatus 10 for managing safety of a secondary battery according to an embodiment of the present disclosure may be included in a load device 300 as shown in FIG. 5.

The load device 300 is a device that receives a power from the secondary battery B, and may be a handheld device that can be carried in a person's hand, such as a mobile phone, a laptop computer, a digital camera, a video camera, a tablet computer, and a power tool. Also, the load device 300 may be an electric-powered vehicle such as a hybrid electric vehicle, a plug-in hybrid vehicle, or an electric vehicle.

In the description of the various exemplary embodiments of the present disclosure, it should be understood that the element referred to as 'unit' is distinguished functionally rather than physically. Therefore, each element may be selectively integrated with other elements or each element may be divided into sub-elements for effective implementation control logic(s). However, it is obvious to those skilled in the art that, if functional identity can be acknowledged for the integrated or divided elements, the integrated or divided elements fall within the scope of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An apparatus for managing safety of a secondary battery, the apparatus comprising:

a voltage measuring unit configured to measure a voltage of a cell included in the secondary battery;

a temperature measuring unit configured to measure a temperature of the cell included in the secondary battery;

a discharging switch connected in parallel with a charging and discharging path of the secondary battery;

a load resistor connected between the discharging switch and a ground; and a control unit operably coupled to the voltage measuring unit, the temperature measuring unit and the discharging switch, wherein the control unit is configured to:

measure a cell voltage and a cell temperature by using the voltage measuring unit and the temperature measuring unit, turn on the discharging switch to forcibly discharge the secondary battery through the load resistor when it is determined that a state where the cell voltage and the cell temperature are respectively equal to or greater than a critical voltage and a critical temperature according to a preset swelling management condition continues over a reference time, and turn off the discharging switch when a cell voltage or a cell temperature measured through the voltage measuring unit and the temperature measuring unit during the forced discharge falls below a preset safe voltage or a preset safe temperature according to the swelling management condition, wherein the swelling management condition is set as a plurality of conditions, and the critical voltage, the critical temperature and the reference time are set independently for each condition among the plurality of conditions, wherein the critical voltage, the critical temperature and the reference time are determined based on a designated swelling level of the secondary battery, and wherein the reference time is set based on a time duration for a volume of the cell to increase a set percent and subtracting a margin of safety from the time duration.

2. The apparatus for managing safety of the secondary battery according to claim 1, wherein the safe voltage and the safe temperature are set independently for each condition among the plurality of conditions.

3. The apparatus for managing safety of the secondary battery according to claim 1, further comprising:

a memory unit in which a look-up table defining the critical voltage, the critical temperature, the safe voltage and the safe temperature according to the swelling management condition is recorded.

4. A battery management system, comprising the apparatus for managing safety of the secondary battery according to claim 1.

5. A load device, comprising the battery management system according to claim 4.

6. The apparatus for managing safety of the secondary battery according to claim 1, wherein the set percent is approximately 1% volume increase.

7. The apparatus for managing safety of the secondary battery according to claim 1, wherein the plurality of conditions include a first condition and a second condition, wherein the first condition includes a first critical voltage, a first critical temperature and a first reference time, and wherein the second condition includes a second critical voltage, a second critical temperature and a second reference time, the second critical voltage being higher than the first critical voltage, the second critical temperature being lower than the first critical temperature and the second reference time being equal to the first reference time.

8. The apparatus for managing safety of the secondary battery according to claim 1, wherein the secondary battery includes a high potential terminal connected to a load device and a low potential terminal connected to the load device, and wherein the discharging switch is connected to the high potential terminal of the secondary battery.

9. The apparatus for managing safety of the secondary battery according to claim 1, wherein the temperature measuring unit includes:

a first thermocouple connected to an outside of the secondary battery; and a second thermocouple connected to the cell included in the secondary battery.

10. The apparatus for managing safety of the secondary battery according to claim 1, wherein the temperature measuring unit includes a plurality of connections to the secondary battery.

11. An apparatus for managing safety of a secondary battery including a plurality of cells, the apparatus comprising:

a voltage measuring unit configured to measure voltages of the plurality of cells;

a temperature measuring unit configured to measure temperatures of the plurality of cells;

a discharging switch connected in parallel with a charging and discharging path of the secondary battery;

a load resistor connected between the discharging switch and a ground; and a control unit operably coupled to the voltage measuring unit, the temperature measuring unit and the discharging switch, wherein the control unit is configured to:

measure voltages and temperatures of the plurality of cells through the voltage measuring unit and the temperature measuring unit, turn on the discharging switch to forcibly discharge the secondary battery through the load resistor when it is determined that a state where a maximum value of the cell voltages and a maximum value of the cell temperatures are respectively equal to or greater than a critical voltage and a critical temperature according to a preset swelling management condition continues over a reference time, and turn off the discharging switch when the maximum value of a plurality of cell voltages and the maximum value of a plurality of cell temperatures respectively measured through the voltage measuring unit and the temperature measuring unit during the forced discharge falls below a preset safe voltage or a preset safe temperature, respectively according to the swelling management condition, wherein the swelling management condition is set as a plurality of conditions, and the critical voltage, the critical temperature and the reference time are set independently for each condition among the plurality of conditions, wherein the critical voltage, the critical temperature and the reference time are determined based on a set swelling level of the secondary battery, and wherein the reference time is set based on a time duration for a volume of a cell of the plurality of cells to increase a set percent and subtracting a margin of safety from the time duration.

12. The apparatus for managing safety of the secondary battery according to claim 11, further comprising:

a timer unit configured to apply an operation start signal to the control unit whenever a predetermined time passes, wherein when the operation start signal is applied from the timer unit, the control unit is configured to receive a power from the secondary battery to start an operation, and come into a sleep mode or a power-off mode after turning off the discharging switch.

13. A battery management system, comprising the apparatus for managing safety of the secondary battery according to claim 11.

14. A load device, comprising the battery management system according to claim 13.

15. A method for managing safety of a secondary battery, the method comprising:

providing a discharging switch connected in parallel with a charging and discharging path of the secondary battery and a load resistor connected between the discharging switch and a ground;

measuring voltage and temperature of a cell included in the secondary battery by using a voltage measuring unit and a temperature measuring unit;

turning on the discharging switch to forcibly discharge the secondary battery through the load resistor when a state where the cell voltage and the cell temperature are respectively equal to or greater than a critical voltage and a critical temperature according to a preset swelling management condition continuing over a reference time; and turning off the discharging switch when the cell voltage or the cell temperature measured through the voltage measuring unit or the temperature measuring unit during the forced discharge falls below a preset safe voltage or a preset safe temperature according to the swelling management condition, wherein the swelling management condition is set as a plurality of conditions, and the critical voltage, the critical temperature and the reference time are set independently for each condition among the plurality of conditions, wherein the critical voltage, the critical temperature and the reference time are determined based on a set swelling level of the secondary battery, and wherein the reference time is set based on a time duration for a volume of the cell to increase a set percent and subtracting a margin of safety from the time duration.

16. The method for managing safety of the secondary battery according to claim 15, wherein the safe voltage and the safe temperature are set independently for each condition among the plurality of conditions.

17. The method for managing safety of the secondary battery according to claim 15, further comprising:

referring to a look-up table defining the critical voltage, the critical temperature, the safe voltage and the safe temperature according to the swelling management condition.

18. The method for managing safety of the secondary battery according to claim 15, further comprising:

receiving an operation start signal from a timer unit whenever a predetermined time passes;

receiving a power from the secondary battery to start an operation when the operation start signal is applied; and after the turning off the discharging switch, coming into a sleep mode or a power-off mode.

19. A method for managing safety of a secondary battery, the method comprising:

providing a discharging switch connected in parallel with a charging and discharging path of the secondary battery including a plurality of cells and a load resistor connected between the discharging switch and a ground;

measuring voltages and temperatures of the plurality of cells through a voltage measuring unit and a temperature measuring unit;

turning on the discharging switch to forcibly discharge the secondary battery through the load resistor when it is determined that a state where a maximum value of the cell voltages and a maximum value of the cell temperatures are respectively equal to or greater than a critical voltage and a critical temperature according to a preset swelling management condition continuing over a reference time; and turning off the discharging switch when a maximum value of the cell voltages and a maximum value of the cell temperatures measured through the voltage measuring unit and the temperature measuring unit during the forced discharge falls below a preset safe voltage or a preset safe temperature according to the swelling management condition, wherein the swelling management condition is set as a plurality of conditions, and the critical voltage, the critical temperature and the reference time are set independently for each condition among the plurality of conditions, wherein the critical voltage, the critical temperature and the reference time are determined based on a set swelling level of the secondary battery, and wherein the reference time is set based on a time duration for a volume of a cell of the plurality of cells to increase a set percent and subtracting a margin of safety from the time duration.

20. The method for managing safety of the secondary battery according to claim 19, further comprising:

receiving an operation start signal from a timer unit whenever a predetermined time passes;

receiving a power from the secondary battery to start an operation when the operation start signal is applied; and after the turning off the discharging switch, coming into a sleep mode or a power-off mode.

* * * * *